United States Patent Office 3,482,197
Patented Dec. 2, 1969

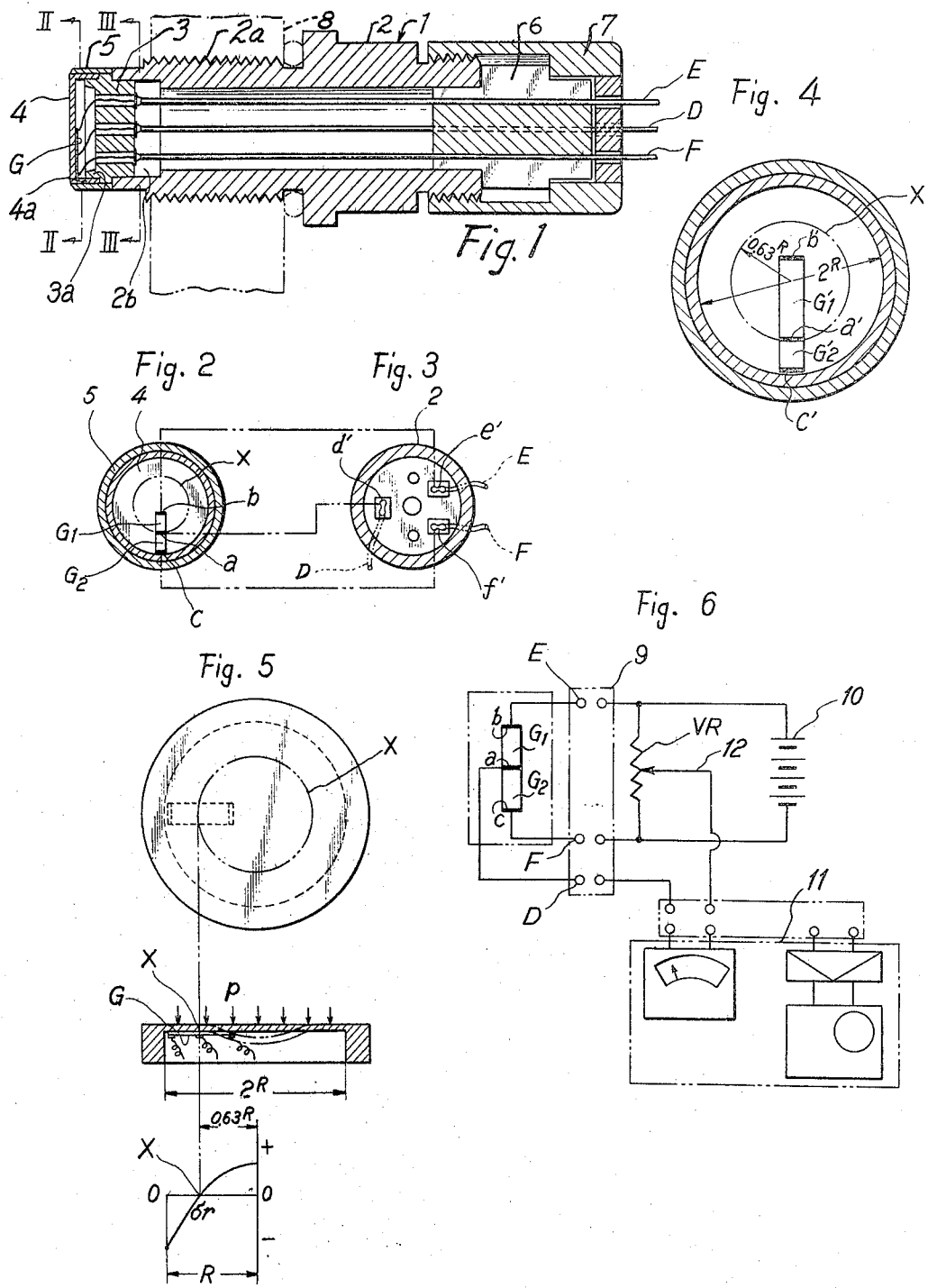

3,482,197
PRESSURE SENSITIVE DEVICE INCORPORATING SEMICONDUCTOR TRANSDUCER
Takeichi Kondo, Yoshimi Kato, and Yasunori Muramatsu, Kariya, Japan, assignors to Toyoda Machine Works, Ltd., Kariya, Japan
Filed June 7, 1967, Ser. No. 644,317
Claims priority, application Japan, June 7, 1966, 41/36,908
Int. Cl. G01l 1/22
U.S. Cl. 338—4
3 Claims

ABSTRACT OF THE DISCLOSURE

A pressure sensitive transducer comprising a casing with a flexible disk diaphragm supported thereon. A rectangular monocrystalline layer of semiconductive material is bonded to a diaphragm which is supported such that the diaphragm has in concentric relation a positive stress activating zone and a negative stress activating zone. Electrodes are provided on and extending across the layer at the ends thereof and at a central location therein, thus dividing the layer into two parts.

---

The present invention relates to a pressure sensitive device incorporating a semiconductor transducer for converting pressure variations into electrical variations.

It is well known that semiconductors such as germanium, silicon, germanium-silicon alloys and intermetallic compounds such as InSb and so forth have been useful in semiconductor transducer elements by reason of their piezo-electric monocrystalline characteristics. Due to their piezo-electric characteristics, the specific resistances of such semiconductor elements are sensitive to any mechanical strains imposed thereon and vary proportionally thereto. Accordingly, such semiconductors are widely utilized as transducer elements for converting pressure variations into electrical variations to measure said pressure variations with high sensitivity. However, the conversion characteristics of their specific resistances in response to mechanical strains are subject to error due to the influence of ambient temperatures. To avoid such inconveniences, various temperature compensation techniques have been studied such as, for example, using two distinct elements, one as an active side and the other as a dummy side, these being separately disposed on a deformable diaphragm to measure pressure variations. However, no effective means have yet been realized for such temperature compensations.

An object of the present invention is to provide a pressure sensitive device incorporating semiconductor transducer, wherein complete compensation for errors due to variations of ambient temperature is realized, together with high sensitivity of pressure measurement.

When a disk firmly fixed around its periphery is subjected to a uniform pressure load thereon, the radial stress ($\sigma r$) produced on said disk is as follows:

$$\sigma r = \mp \frac{3p}{8h^2}\left\{(1+\nu)R^2 - (3+\nu)r^2\right\}$$

wherein:

$h$ is the thickness of the disk
$p$ is the pressure load
$R$ is the radius of the disk
$\nu$ is the Poisson's ratio of the material of the disk
$r$ is the radius of any point In this expression, for $\sigma r = 0$ and $\nu = 0.3$, there is obtained: $r = 0.63R$ This means that a point on said disk having radius of 0.63R is a stress converting point and, on the central portion of the disk within the border of a concentric circle of 0.63R radius, a positive stress (tensile stress) is produced, whereas, on the outer peripheral portion of the disk outside of said border, a negative stress (compressive stress) is produced. Thus, a positive stress activating zone and a negative stress activating zone are formed respectively. Moreover, it is also confirmed that the radial stresses produced on said outer peripheral portion are maximum, being larger than those produced on said central portion.

By utilizing advantageously the aforesaid general phenomenon, according to the present invention, there is provided a flexible disk diaphragm firmly gripped around its outer periphery, on one face of which a single, strain transducer element of semiconductor material is disposed radially across its central portion and outer peripheral portion, in such manner that the stress effect on said element is divided substantially into two parts by a conducting electrode on the element at a position corresponding to said stress converting point of the element, the crystal direction of maximum sensitivity of said element being oriented in the radial direction of said disk diaphragm. Thus, as a result of division of the stress effect into two parts on the single element disposed on one face of the diaphragm, the temperature coefficients of resistance become equal, and a self compensation of temperature is effected, whereby the higher sensitivity and higher output result.

According to certain of its principal characteristics, a pressure sensitive device of the present invention comprises a supporting means for a flexible disk diaphragm on one end of a casing gripping firmly said diaphragm around its outer periphery, a single strain-transducer element consisting of a layer of a monocrystal of semiconductor material, the stress sensitive portion of said element being divided substantially into two parts by conductive electrodes across said layer at the center and both ends of said layer in its crystal direction of maximum sensitivity, said element being fixed radially on the inner face of said diaphragm across a positive stress activating zone and a negative stress activating zone in such manner that at least a part of said central conductive electrode is coincident with a stress converting zone between said two stress activating zones, three lead wires extending from said conductive electrodes being connected with an external measuring circuit.

The present invention will next be described in detail in connection with the accompanying drawings in which:

FIG. 1 shows a longitudinal sectional view of an example of the present invention;

FIGS. 2 and 3 are sectional views along lines II—II and III—III of FIG. 1 respectively;

FIG. 4 shows a plan view of a diaphragm of another example of the invention;

FIG. 5 represents schematically the stress distribution on a diaphragm by the invention; and FIG. 6 is a schematic view of an external circuit for recording the output of a strain transducer element.

As shown in FIG. 1, in an example of a pressure sensitive device according to the invention, there is provided a hollow cylindrical casing 2 at one end of which a circular depression 2b is formed, within which a supporting member 3 is fixed. On the outer surface of member 3, a circular projection 3a is coaxially formed to receive a flexible disk diaphragm 4 by its outer peripheral flange 4a. Said diaphragm is firmly gripped by means of a fixing ring 5 bonded thereon.

As this diaphragm is firmly fixed by its outer periphery on the supporting member 3, there are formed, as aforesaid, a positive stress activating zone at its central portion, and a negative stress activating zone at its outer peripheral portion as shown in the stress distribution graph of FIG. 5. A single rectangular layer of strain-transducer element G of semiconductor material is fixed across the positive and negative stress activating zones on the inner face of said diaphragm and, as shown in FIG. 2, a conductive electrode $a$ across said layer is provided at a position on said layer corresponding to a stress converting zone X of the diaphragm 4, whereby said layer is divided into two parts: a positive stress sensitive part $G_1$ and a negative stress sensitive part $G_2$. The crystal direction of maximum sensitivity of said layer G is oriented in the radial direction of said diaphragm 4. The layer G is bonded to a face of the diaphragm 4 with an intermediate insulating film of glass-wool or binder and a further film covers them.

It is also possible to prepare a strain-transducer element in such manner that a monocrystal layer of semiconductor material is vacuum evaporated on the inner face of a diaphragm followed by an etching operation. The resulting layer is finished into a single monocrystal layer extending across the two stress activating zones (positive and negative), doping being effected at the same time. It is further possible to prepare a strain transducer element in such manner that a mask having a shaped window corresponding to the form of an element to be disposed is applied to the inner face of a diaphragm, and then a monocrystal layer of semiconductor material already doped is vacuum evaporated directly on said mask.

The thus prepared strain-transducer element G has other conductive electrodes $b$ and $c$ fixed to both ends respectively, and lead wires extending from these conductive electrodes $a$, $b$ and $c$ are led out of the supporting member 3 through small holes and are connected with terminals $d'$, $e'$ and $f'$ insulated from each other, and wherefrom they are further led out by other wires D, E and F to provide for a bridge circuit wherein the positive stress sensitive part $G_1$ and the negative stress sensitive part $G_2$ are combined to make adjacent arms. Said wires D, E and F are supported by a member 6 fixed by a cap 7 on the other end of the casing 2. A threaded screw part 2$a$ in the vicinity of the front end of the casing 2 serves for fixing this device on the wall 8 of any vessel wherein exists the pressure to be measured. As shown in FIG. 6, wires D, E and F are connected with an input electric source 10 and an output recording circuit 11 by means of a terminal block 9 to provide for recording electrically an output corresponding to pressure variations to be measured. The wires E and F connected with direct current source 10 constitute an input side, and the wire D and the slider 12 of a shunted adjustable resistance VR for balancing the bridge circuit constitute an output side. Thereby indicating instruments such as a voltmeter, an ammeter and a synchroscope or recording devices such as an oscilloscope or the like are operated.

Another example of the invention is shown in FIG. 4. In this example, a strain-transducer element longer than the radius of the diaphragm is used in order to utilize its full length. In such arrangement, the effective lengths of a positive stress sensitive part $G_1'$ and a negative stress sensitive part $G_2'$ are different. Nevertheless, a complete temperature compensation is obtained, because of equal temperature coefficient of resistance of said two stress sensitive parts. In this case, by making a broader conductive electrode $a'$ extending towards the center of the diaphragm from the stress converting zone X, so as to short-circuit a part of the element, it is possible to equalize the effective lengths of said two sensitive parts $G_1'$ and $G_2'$.

In the device thus constructed, after the bridge circuit has been balanced by adjusting the variable resistance VR of the measuring circuit (FIG. 6), the pressure sensitive part at the front end of the device 1 is inserted into a pressure atmosphere to be measured.

According to the pressure applied on the diaphragm 4, the specific resistances of two stress sensitive parts $G_1$ and $G_2$ of the strain transducer element G bonded on the diaphragm 4, are increased or decreased respectively under the effect of positive and negative stresses. Accordingly, the balance of the bridge circuit is destroyed, and output signals converted into electrical voltages or currents are detected on the output side, which are legible on the converted pressure unit.

As is clear from the foregoing, in the device of the invention, the crystal direction of maximum sensitivity of the strain transducer element G is always oriented in the radial direction of the diaphragm 4, and only the stresses of radial direction are sensed. Moreover, the single element is divided into two sensitive parts $G_1$ and $G_2$ (positive and negative), whereby a higher sensitivity and higher output of said two sensitive parts are obtained. Further, as the element is single, the temperature coefficients of resistance are quite equal and any error outputs of said two sensitive parts due to temperature change cancel each other in the bridge circuit, whereby the output signals proportional only to pure pressure variations are obtained with complete temperature compensation. Furthermore, as a single element can be disposed across two activating zones (positive and negative), a relatively large sized element as compared with the radius of the diaphragm can be used, whereby the contact area of said element becomes larger and creep is reduced and the durability of the pressure sensitive parts is improved, which permits of preparing an extremely small-sized pressure sensitive member, such as diaphragm members having diameters of less than 10 mm.

It is to be understood that the present invention is not limited to the above-mentioned examples and can comprise many variants without departing from the scope of the invention.

What we claim is:

1. A pressure-sensitive transducer comprising a casing, a flexible disk diaphragm, support means peripherally engaging said diaphragm and supporting the same on said casing such that the diaphragm has in concentric relation a positive stress activating zone and a negative stress activating zone, a rectangular monocrystalline layer of semiconductor material bonded to said diaphragm, electrodes on and extending across said layer at the ends and a central location of said layer thereby dividing the layer into two parts, the layer having a crystal direction of maximum sensitivity and being disposed on the diaphragm with said direction oriented radially on the diaphragm, the electrode being aligned transversely of said direction and with the central of the electrodes coincident with the transition of one zone to the other, and leads connected to the electrodes.

2. A transducer as claimed in claim 1, wherein the layer has a length approximately equal to the effective radius of the diaphragm.

3. A transducer as claimed in claim 1, wherein the layer has a length greater than the effective radius of the diaphragm.

References Cited

UNITED STATES PATENTS

| | | | |
|---|---|---|---|
| 3,089,108 | 5/1963 | Gong et al. | |
| 3,186,217 | 6/1965 | Pfann | 338—5 X |
| 3,289,134 | 11/1966 | Laimins et al. | 338—42 X |
| 3,325,761 | 6/1967 | McLellan | 338—42 X |

OTHER REFERENCES

Electronics, Oct. 17, 1966, p. 155.

REUBEN EPSTEIN, Primary Examiner

U.S. Cl. X.R.

73—88.5, 398; 338—22, 42